US008856565B2

(12) United States Patent
Stancil

(10) Patent No.: US 8,856,565 B2
(45) Date of Patent: Oct. 7, 2014

(54) DIGITAL SIGNAGE MODE OF PORTABLE DEVICE

(75) Inventor: Charles J Stancil, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 13/219,233

(22) Filed: Aug. 26, 2011

(65) Prior Publication Data

US 2013/0054994 A1 Feb. 28, 2013

(51) Int. Cl.
*G06F 1/26* (2006.01)
*G06F 11/30* (2006.01)
*G06F 1/32* (2006.01)

(52) U.S. Cl.
CPC .................................. *G06F 1/3203* (2013.01)
USPC ............................ 713/320; 713/300; 713/340

(58) Field of Classification Search
CPC .......... G06F 1/26; G06F 1/3203; G06F 11/30
USPC ......................................... 713/300, 320, 340
See application file for complete search history.

(56) References Cited

U.S. PATENT DOCUMENTS

| 6,052,793 | A * | 4/2000 | Mermelstein ................. 713/340 |
| 7,732,949 | B2 * | 6/2010 | Goodnow et al. ............. 307/151 |
| 2004/0073817 | A1 * | 4/2004 | Liu et al. ........................ 713/300 |
| 2005/0041351 | A1 * | 2/2005 | Dunstan .......................... 361/92 |
| 2007/0150760 | A1 * | 6/2007 | Nowlin .......................... 713/300 |
| 2009/0307441 | A1 * | 12/2009 | Hepkin et al. ................. 711/153 |

OTHER PUBLICATIONS

"How to Automatically Shutdown Laptop if Unplugged Power", http://www.trickyways.com/2010/07/how-to-automatically-shut-down-laptop-if-unplugged/, downloaded Internet Aug. 26, 2011.
"Plan for controlled system shutdown". IBM, 1998, 2002, http://publib.boulder.ibm.com/iseries/v5r2/ic2924/info/rzahr/rzahr.pdf, downloaded from the Internet on Aug. 26, 2011.
"ShutControl—Laptop Shutdown Conroller Software", http://www.digital-car.co.uk/forum/archive/index.php/t-4857.html, downloaded from the Internet on Aug. 26, 2011.

* cited by examiner

*Primary Examiner* — Mark Connolly
(74) *Attorney, Agent, or Firm* — Chun-Liang Kuo

(57) ABSTRACT

A portable device includes a power component to receive power from a power source and a controller to transition the portable device from a power on state to a lower power state with a basic input output system (BIOS) of the portable device if the power component detects a loss of power received from the power source and transition the portable device from the lower power state to a digital signage mode with the BIOS if the power component receives power from the power source.

12 Claims, 6 Drawing Sheets

DIGITAL SIGNAGE MODE OF PORTABLE DEVICE

BACKGROUND

A business may wish to demo the features and functionality of a portable device for customers to view during business hours. The business may manually launch one or more applications tailored to display the functionality of the portable device. As the business closes operation for the day, the business may turn off power to the portable device. The portable device can remain on until a battery of the portable device drains which may lead to wasted power. Once the business resumes operation on another day, the business may manually turn on the device and proceed to manually launch one or more applications again for a customer to view the features and functionality of the portable device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

As a business is operating during business hours, the business may turn on or enable a power source to supply power to a portable device. A power component of the portable device can supply power to components for the portable device to be in a power on state. If the portable device is powered on, the portable device can launch a digital signage mode for the portable device to output advertisements in the form of a video message and/or an audio message. The video and/or audio messages can list or describe the features and/or functions of the portable device.

While the portable device is in the power on state, the power component can detect if it has stopped receiving power. In response, the portable device can transition from the power on state to a lower power state with a basic input output system (BIOS) of the portable device. The lower power state can include a sleep state, a hibernation state, and/or a soft power off state. As a result, the portable device can save power by not continuing to operate in the digital signage mode when the business may be closed.

If the power component resumes receiving power while the portable device is in the lower power state, the portable device can transition from the lower power state to the digital signage mode with an instruction from the BIOS. As a result, the portable device can automatically launch the digital signage mode for demoing the portable device when the business resumes operation and supplies power to the power component through the power source.

Figure 1:
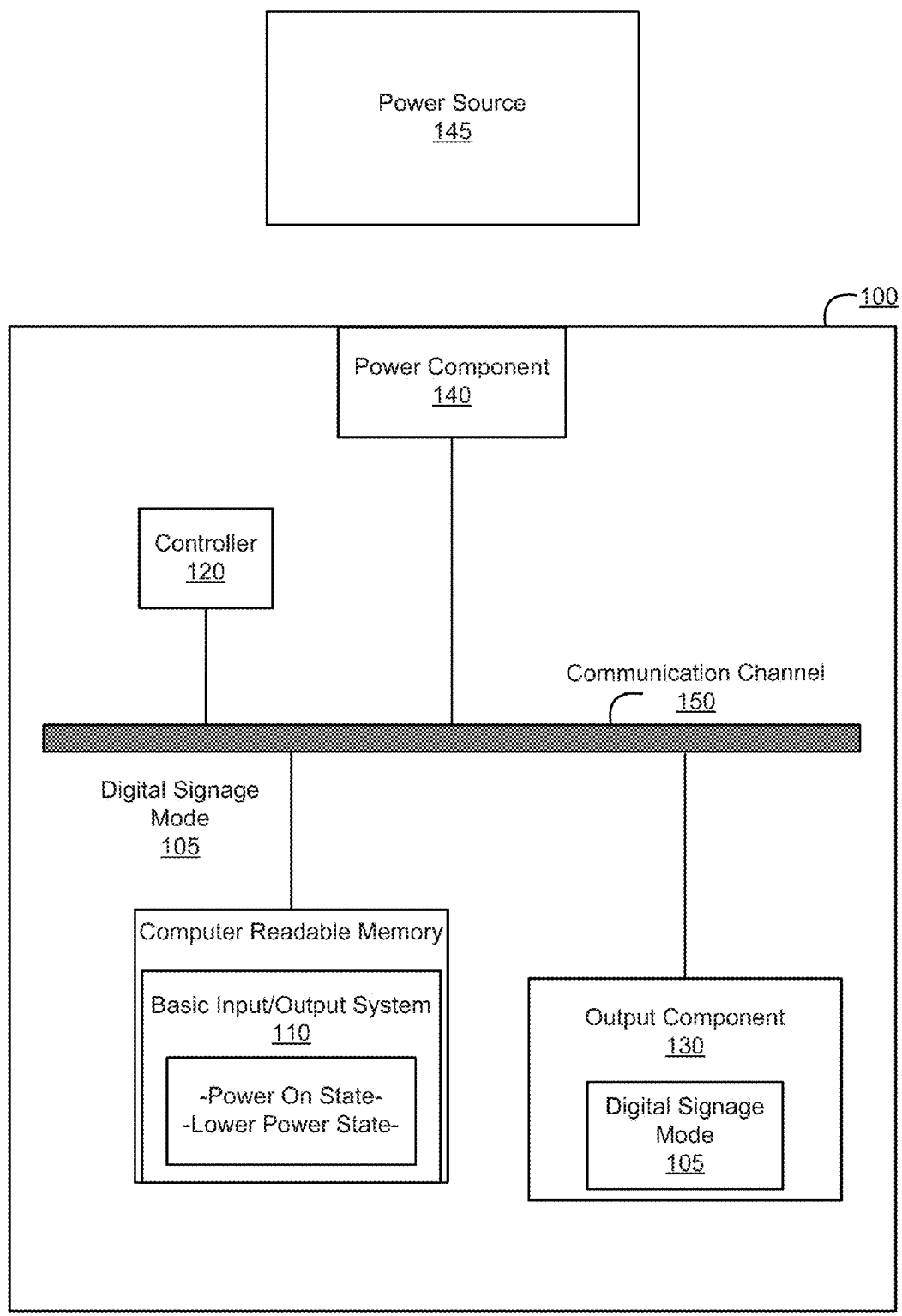
FIG. 1 illustrates a portable device according to an example.

FIG. 1 illustrates a portable device 100 according to an example. The portable device 100 is a portable computing device which can operate in a digital signage mode 105 if the portable device 100 is in a power on state. For the purposes of this application, the portable device 100 is in a power on state if one or more components of the portable device 100 are powered on for use on the portable device 100. A digital signage mode 105 is a mode of operation for the portable device 100 to output information and/or advertisements in the form of audio and/or video messages. The audio and/or video messages can list or describe functions and/or features of the portable device 100.

In one embodiment, the portable device 100 is a laptop, a notebook, a tablet, a netbook, an all-in-one system, desktop, and/or any additional hand held computing device which can include a power component 140. In another embodiment, the portable device 100 can be a cellular device, a PDA (Personal Digital Assistant), an E (Electronic)-Reader, and/or any additional device which can operate in a digital signage mode 105. As shown in FIG. 1, the portable device 100 includes a controller 120, a basic input/output system (BIOS) 110, a power component 140, an output component 130, and a communication channel 150 for the components of the portable device 100 to communicate with one another.

The controller 120 and/or the BIOS 110 of the portable device 100 can operate independently and/or in conjunction with one another to manage the portable device 100. The BIOS 110 can be a firmware or application which can be executed by the controller 120 from a non-transitory computer readable memory of the portable device 100. When managing the portable device 100, the controller 120 and/or the BIOS 110 can enter and/or transition the portable device 100 between one or more power states based on whether a power component 140 is receiving power from a power source 145. One or more power states can include a power on state, a sleep state, a hibernation state, a soft off state, and/or a mechanical off state.

The power component 140 is a hardware component which can supply power to one or more components for the portable device 100 to be in a power on state. The portable device 100 can be coupled to a power source 145 for the power component 140 to receive and store power. In one embodiment, the power component 140 includes a battery to store the received power. The power source 145 is a device which can be coupled to the portable device 100 to physically, wirelessly, and/or inductively supply power to the power component 140.

If the portable device 100 is in a power on state, the controller 120 and/or the BIOS 110 can launch a digital signage mode 105 of the portable device 100. In one embodiment, the controller 120 and/or the BIOS 110 can launch the digital signage mode 105 in response to the portable device 100 powering on from a power off state. In another embodiment, the digital signage mode 105 can be launched by the controller 120 and/or the BIOS 110 in response to the portable device 100 transitioning from a sleep state to a power on state.

For the purposes of this application, the portable device 100 is in a digital signage mode 105 if the controller 120 and/or the BIOS 110 launch a digital signage application which utilizes an output component 130 to output information and/or advertisements of the portable device 100. In one embodiment, the digital signage application can be an operating system of the portable device 100. In another embodiment, the digital signage application can be a shell of an operating system. In other embodiments, the digital signage application can be a firmware of the portable device 100. Launching the digital signage mode 105 can include the controller 120 and/or the BIOS 110 modifying a boot sequence of the portable device 100.

Once the portable device 100 is in the digital signage mode 105, the digital signage application can output an audio message and/or a video message through an output component 130 of the portable device 100. For the purposes of this application, the output component 130 is a hardware component, such as a display device and/or an audio device, which can output a visual message and/or an output audio of the audio message to list or describe functions and/or features of the portable device 100. In another embodiment, the digital signage application can be an interactive application which can output an audio message and/or a video message. As the user is interacting with the digital signage application, the user can experience in the features and/or functions of the portable device 100.

As the portable device 100 is operating in the digital signage mode 105, the power component 140 can detect if stops receiving power. In response to not receiving any power, the power component 140 can notify the controller 120 and/or the BIOS 110 that a loss of power is detected. The controller 120 and/or the BIOS 110 can then transition the portable device 100 from the power on state to a lower power state. In one embodiment, the controller 120 and/or the BIOS 110 can transition the portable device to the lower power state with an advanced configuration and power interface (ACPI) instruction. The lower power state can include a sleep state, a hibernation state, and/or a soft off state. In one embodiment, the controller 120 and/or the BIOS exit the digital signage mode 105 by terminating the digital signage application before transitioning into the lower power state.

As the portable device 100 is in the lower power state, the power component 140 can detect for power being supplied to it. If the power component 140 resumes receiving power, the power component 140 can notify the controller 120 and/or the BIOS 110 that power is being received for the portable device 100. In response, the controller 120 and/or the BIOS 110 can transition the portable device 100 from the lower power state to the digital signage mode 105. Transitioning the portable device 100 to the digital signage mode 105 can include the controller 120 and/or the BIOS 110 executing an ACPI instruction to power on the portable device 100 and modifying the boot sequence of the portable device 100 to launch the digital signage application.

Figure 2:
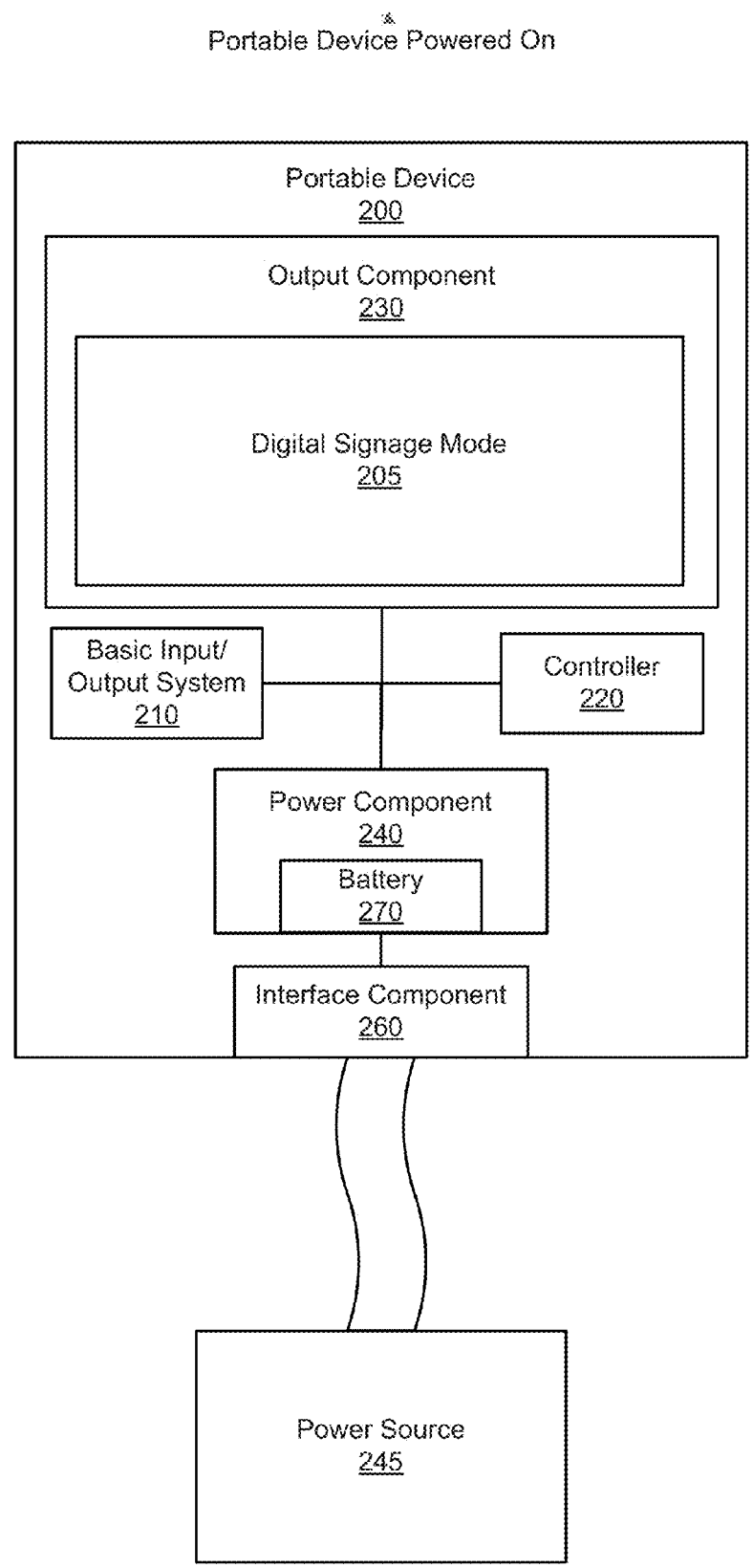
FIG. 2 illustrates a portable device coupled to a power source according to an example.

FIG. 2 illustrates a portable device 200 coupled to a power source 245 according to an example. As illustrated in FIG. 2, the power source 245 is a device which can couple with an interface component 260 of the portable device 200 to supply power to the power component 240 of the portable device 200. In one embodiment, the power source 245 can be a power outlet or a battery. The power source 245 can physically couple to the interface component 260 through a power cable. In another embodiment, the power source 245 can inductively or wirelessly couple with the interface component 260.

The interface component 260 is a hardware component which couples and interfaces the power component 240 to the power source 245. The interface component 260 can include a port, an antenna, and/or a magnetic coil to couple and interface with the power source 245. In another embodiment, the interface component 260 can include a sensor to detect if the power source 245 is coupled to the interface component 260. Through the interface component 260, the power source 245 can supply physically, wirelessly, and/or inductively power to the power component 240. The power can be supplied to the power component 240 as an alternating current or a direct current.

As noted above, the power component 240 is a hardware component of the portable device 200 which can receive and/or store power received from the power source 245. In one embodiment, the power component 240 is a power supply of the portable device 200. Additionally, as illustrated in FIG. 2, the power component 240 includes a battery 270 to store any power received from the power source 245. The power component 240 can supply power to component of the portable device 200 for the portable device 200 be in a power on state.

If the portable device 200 is in a power on state, the controller 220 and/or the BIOS 210 can launch a digital signage application for the portable device to enter a digital signage mode 205. For the purposes of this application, the digital signage application can be stored on a non-transitory computer readable memory coupled to the portable device 200. The digital signage mode 205 is a mode of operation of the portable device 200 where the digital signage application utilizes an output component 230 of the portable device 200 to advertise information and/or features of the portable device 200.

In one embodiment, the advertised information and/or features can disclose technical specifications of the portable device 200. The technical specifications can list or describe hardware or software components available to the portable device 200. In another embodiment, the information and/or features can list and/or describe accessories which are available to the portable device 200. In other embodiments, the information and/or features can disclose information of a manufacturer of the portable device 200.

The output component 230 can include a display component to display one or more visual messages listing or describing the information and/or features of the portable device 200. In another embodiment, the output component 230 can include an audio component to output one or more audio messages listing or describing the information and/or features of the portable device 200. In other embodiments, the output component 230 can additionally include a haptic feedback device to supplement a video message and/or an audio message.

Figure 3:
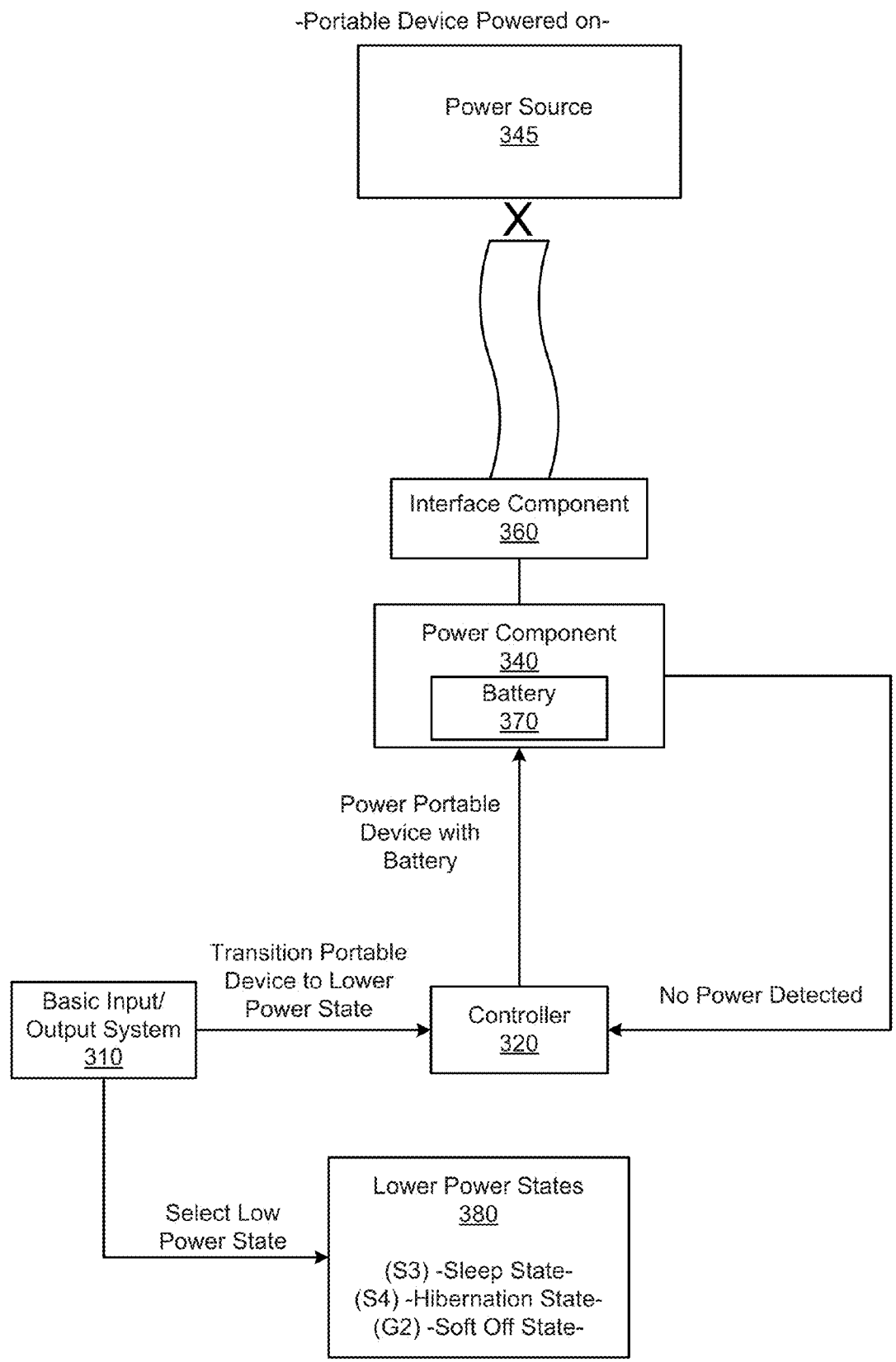
FIG. 3 illustrates a block diagram of a portable device transitioning to a lower power state according to examples.

FIG. 3 illustrates a block diagram of a portable device transitioning to a lower power state 380 according to examples. As the portable device operates in the power on state and in the digital signage mode, the power component 340 can detect for a loss of power. In one embodiment, the power component 340 stops receiving power if a physical interface of the power source 345 is decoupled from the interface component 360. In another embodiment, the power component 340 stops receiving power if the power component 340 does not receive an inductive charge from a power source. In other embodiments, the power component 340 stops receiving power if the power source 345 is turned off or disabled.

The power component 340 can notify the controller 320 and/or the BIOS 310 that no power is detected. In response, the controller 320 and/or the BIOS 310 can instruct the power component 345 to continue to power components of the portable device with the battery 370. The controller 320 and/or the BIOS 310 can then proceed to transition the portable device to a lower power state 380. In one embodiment, the controller 320 and/or the BIOS 310 can wait for a predefined amount of time elapsing before transitioning the portable device to the lower power state 380. The predefined amount of time can be defined by the controller 320, the BIOS 310, a manufacturer of the portable device, a user of the portable device, and/or by a business demoing the portable device.

As illustrated in FIG. 3, a lower power state can include a sleep state, a hibernation state, and/or a soft off state. If more than one lower power state 380 is available, the controller 320 and/or the BIOS 310 can proceed to determine which of the lower power states 380 to select. A lower power state 380 can be selected by the controller 320 and/or the BIOS 310 based on an anticipated amount of time which the power component 340 will not receive power from the power source 345.

The anticipated amount of time can be based on operating hours or operating days of a business. In another embodiment, the anticipated amount of time can be based off of holidays where the business can remain dosed for an extended period of time. The controller 320 and/or the BIOS 310 can access a dock to determine a current time and date. Additionally, the controller 320 and/or the BIOS 310 can access a calendar listing the days of operation and/or listing holidays which the business may remain closed to determine which lower power state 380 to select.

If the business is dosing for the day and the business resumes operation the next day, the selected lower power state 380 can be a sleep state. In another embodiment, if the following day is a day which the business typically remains dosed, the selected lower power state 380 can be a hibernation state. In other embodiments, if the business is expected to remain dosed for an extended period of time due to typical closures and/or holidays, the selected lower power state 380 can be a soft power off state.

The controller 320 and/or the BIOS 310 can then transition the portable device to the corresponding lower power state 380 with a corresponding ACPI instruction associated with the selected lower power state 380. In one embodiment, the controller 320 and/or the BIOS 310 terminate the digital signage application before transitioning the portable device to the lower power state. In another embodiment, the digital signage application can be written to a memory or a non-volatile storage component of the portable device before the portable device transitions to the lower power state.

Figure 4:
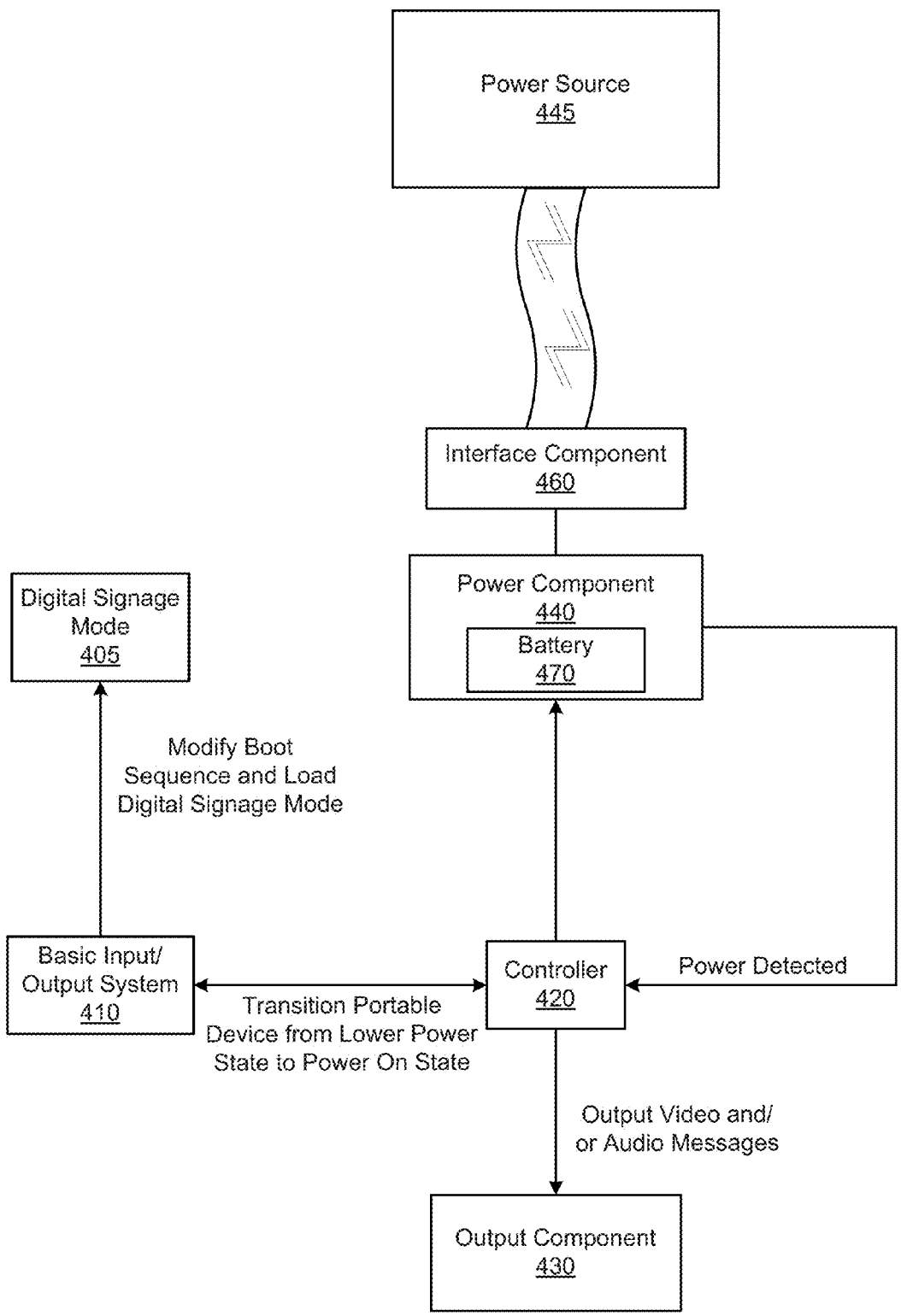
FIG. 4 illustrates a block diagram of a portable device transitioning to a power on state and launching a digital signage mode of the portable device according to an example.

FIG. 4 illustrates a block diagram of a portable device transitioning to a power on state and launching a digital signage mode 405 of the portable device according to an example. As the portable device remains in the lower power state, the power component 440 can detect for power being resumed to the power component 440. In one embodiment, the battery 470 can supply power to the power component 440 for the power component 440 to detect for power. In another embodiment, the power component 440 can be triggered to awaken in response to the power source 445 supplying any power to the power component 440.

As illustrated in FIG. 4, the power source 445 has resumed supplying power to the power component 440. In response to the power component 445 proceeds to power on the portable device by supplying power to the components. In one embodiment, the power component 440 additionally sends a message to the controller 420 and/or the BIOS 410 indicating that power is detected from the power source 445. In response to powering on, the controller 420 and/or the BIOS 410 proceed to launch a digital signage mode 405 of the portable device. As noted above, the portable device can be in a sleep state, a hibernation state, and/or a soft power off state. As a result, the portable device can enter and/or transition into the digital signage mode 405 in response the portable device powering on from the sleep state, the hibernation state, and/or the soft power off state.

Entering the digital signage mode 405 can include the controller 420 and/or the BIOS 410 launching a digital signage application. As noted above, the digital signage application can be an operating system, a shell of an operating system, a firmware of the portable device, and/or any additional application to output audio messages and/or video messages listing or describing the features and/or functions of the portable device. In one embodiment, the controller 420 and/or the BIOS 410 can use a boot loader of the portable device when launching the digital signage mode 405.

The boot loader can modify a boot sequence of the portable device by selecting the digital signage application to launch instead of another operating system on the portable device. In another embodiment, the boot loader can select the digital signage application to be run as a shell of an operating system of the portable device. Once the portable device is in the digital signage mode, the digital signage application can operate independent and/or in conjunction with the controller 420 and/or the BIOS 410 to output one or more audio messages and/or one or more visual messages with the output component 430.

Figure 5:
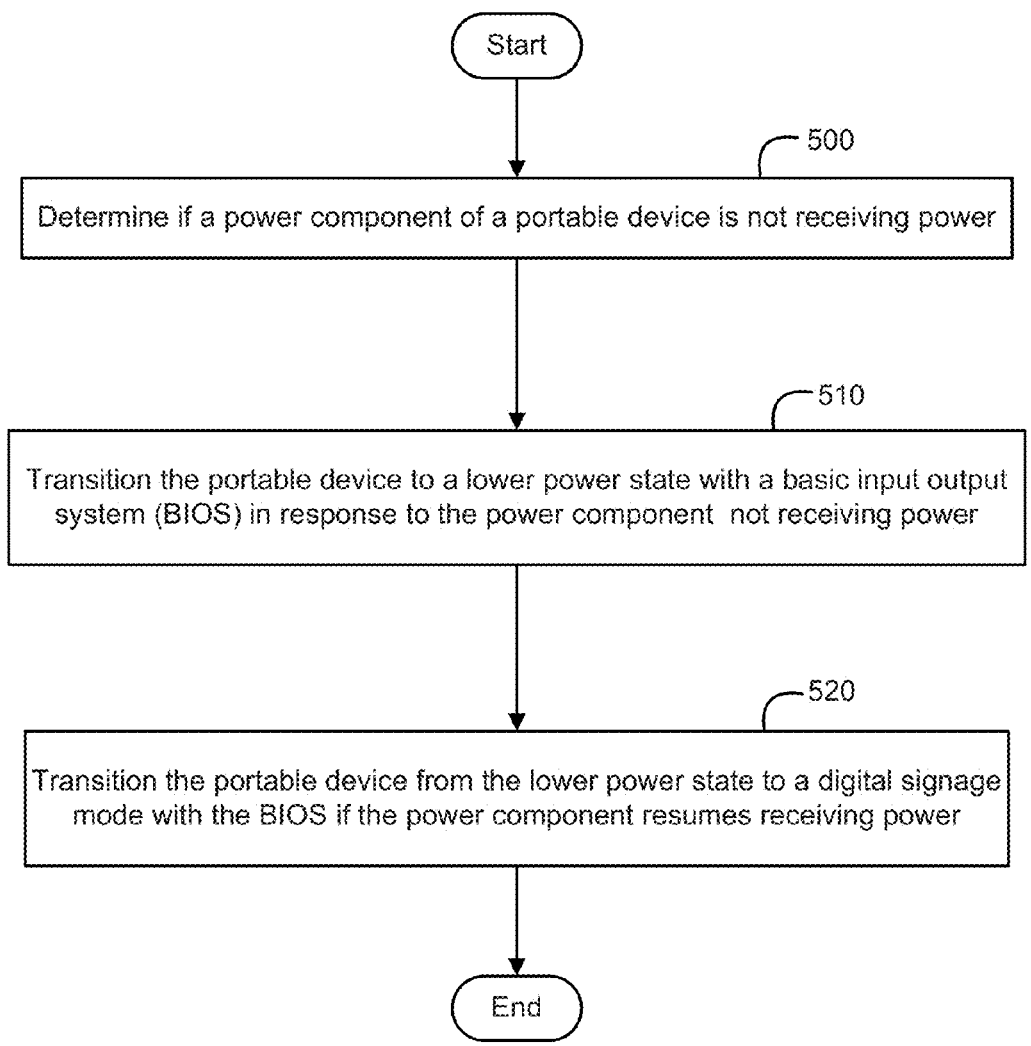
FIG. 5 is a flow chart illustrating a method for managing a portable device according to an example.

FIG. 5 is a flow chart illustrating a method for managing a portable device according to an example. The portable device can include a power component, a controller, a BIOS, an output component, and a communication channel. In one embodiment, the portable device additionally includes an interlace component to couple the power component to a power source. The power source is a device which can supply power to the power component as a direct current or an alternating current. Using the power from the power source, the power component can supply power to the components for the portable device to be in a power on state. In one embodiment, the power component additionally includes a battery to store power from the power source.

If the portable device is powered on, the controller and/or the BIOS can launch a digital signage application for the portable device to enter a digital signage mode. The digital signage application can output an audio message and/or a video message to list or describe a feature or function of the portable device. The output component can include a display component, an audio speaker, and/or a haptic feedback device. As the portable device operates in the digital signage mode, the power component can determine if it is not receiving power at 500.

If the power component stops receiving, the power component can notify the controller and/or the BIOS. The controller and/or the BIOS can then transition the portable device to a lower power state at 510. In one embodiment, the controller and/or the BIOS use an ACPI instruction to transition the portable device to the lower power state. As the portable device is in the lower power state, the power component can detect for power being supplied to it. If the power source resumes supplying power to the power component, the portable device can power on and transition from the lower power state to the digital signage mode at 520. The method is then complete. In other embodiments, the method of FIG. 5 includes additional steps in addition to and/or in lieu of those depicted in FIG. 5.

Figure 6:
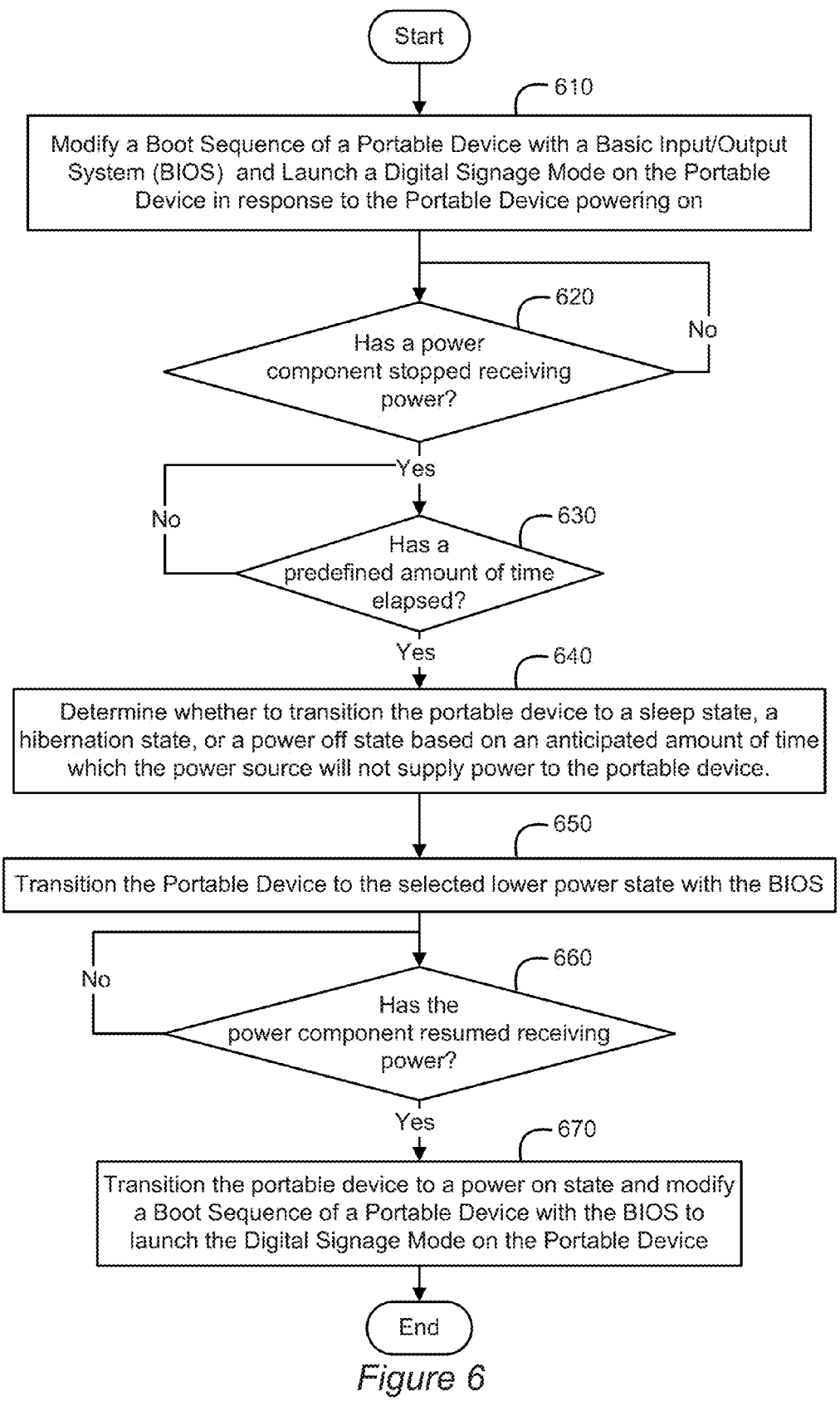
FIG. 6 is a flow chart illustrating a method for managing a portable device according to an example.

FIG. 6 is a flow chart illustrating a method for managing a portable device according to an example. A power component of the portable device can be coupled to a power source to receive power. If the power source is supplying power to the power component, the power can be used to power on the portable device. In response to the portable device powering on, the controller and/or the BIOS can modify a boot sequence of the portable device to launch a digital signage mode of the portable device at 610.

As the portable device operates in the digital signage mode, the power component can detect if it stops receiving power at

620. If the power source continues to supply power to the power component, the portable device can continue to operate in the digital signage mode. If the power source stops supplying power to the power component, the power component can notify the controller and/or the BIOS that a loss of power has been detected. The controller and/or the BIOS can then proceed to determine whether a predefined amount of time has elapsed at 630.

If the power component detects power supplied to it before the predefined amount of time elapses, the portable device can remain powered on and continue to operate in the digital signage mode at 630. If the predefined amount of time elapses before the power component detects any power, the controller and/or the BIOS can proceed to determine whether the transition the portable device to a sleep state, a hibernation state, and/or a soft power off state at 640. The controller and/or the BIOS can consider an anticipated amount of time which the power source will continue to not supply power to the portable device when determining which lower power state to select.

Once the controller and/or the BIOS have selected a lower power state, the controller and/or the BIOS can execute a corresponding ACPI instruction to transition the portable device to the selected lower power state sat 650. In one embodiment, the controller and/or the BIOS can terminate the digital signage application before the portable device transitions to the lower power state. As the portable device is in the lower power state, the power component can detect if power is being supplied to it at 660. If the power component resumes receiving power, the portable device can be powered on and the controller and/or the BIOS can transition the portable device to the digital signage mode by modifying a boot sequence of the portable device at 670.

The boot sequence can be modifies such that a digital signage application is selected to be launched instead of another operating system of the portable device or the digital signage application can be executed as a shell of the operating system of the portable device. In one embodiment, the power component can wait a predefined amount of time to determine if the power source continues to supply power to the power component before powering on the portable device. The method is then complete. In other embodiments, the method of FIG. 6 includes additional steps in addition to and/or in lieu of those depicted in FIG. 6.

What is claimed is:

1. A portable device comprising:
    a power component to receive power from a power source; and
    a controller to transition the portable device from a power on state to at least one low power state selected from a sleep state, a hibernation state, and a power off state with a basic input output system (BIOS) of the portable device in response to the power component not receiving power, and based on an anticipated amount of time the portable device will not receive power from the power source;
    wherein the controller transitions the portable device from the low power off state to a digital signage mode with the BIOS if the power component resumes receiving power from the power source.

2. The portable device of claim 1 further comprising a battery to supply power to the portable device if the power component does not receive power from the power source.

3. The portable device of claim 1 wherein the power component detects that no power is being received if an interface component detects the power source decoupled from the portable device.

4. The portable device of claim 1 wherein the power component detects that no power is being received if an interface component does not detect an inductive charge from the power source.

5. The portable device of claim 1 wherein the BIOS transitions the portable device to the power off state with an advanced configuration and power interface (ACPI) instruction.

6. A method for managing a portable device comprising:
    determining if a power component of the portable device is not receiving power from a power source;
    transitioning the portable device to at least one low power state selected from a sleep state, a hibernation state, and a power off state with a basic input output system (BIOS) in response to the power component not receiving power from the power source and based on an anticipated amount of time the portable device will not receive power from the power source; and
    transitioning the portable device from the low power state to a digital signage mode with the BIOS if the power component resumes receiving power from the power source.

7. The method for managing a portable device of claim 6 further comprising detecting for a predefined amount of time elapsing before transitioning the portable device to the power off state.

8. The method for managing a portable device of claim 6 wherein transitioning the portable device to the digital signage mode includes modifying a boot sequence of the portable device.

9. The method for managing a portable device of claim 6 wherein the power component stops receiving power if an interface component of the power component is physically decoupled from a power source.

10. The method for managing a portable device of claim 6 wherein the power component stops receiving power if the power component does not receive an inductive charge from a power source.

11. The method for managing a portable device of claim 6 wherein the power component stops receiving power if the power component does not receive a wireless charge from a power source.

12. A non-transitory computer readable medium comprising instructions that if executed cause a controller to:
    determine if a power component of the portable device is not receiving power;
    transition the portable device, with a basic input output system (BIOS) in response to the power component not receiving power, to at least one low power state selected from a sleep state, a hibernation state, and a power off state based on an anticipated amount of time the portable device will not receive power from a power source; and
    transition the portable device from the low power state to a digital signage mode with the BIOS if the power component resumes receiving power.

* * * * *

UNITED STATES PATENT AND TRADEMARK OFFICE
CERTIFICATE OF CORRECTION

PATENT NO.        : 8,856,565 B2                                              Page 1 of 1
APPLICATION NO.   : 13/219233
DATED             : October 7, 2014
INVENTOR(S)       : Charles J Stancil It is certified that error appears in the above-identified patent and that said Letters Patent is hereby corrected as shown below:

In the Claims:

In column 7, line 58, in Claim 1, after "power" delete "off".

Signed and Sealed this
Twenty-fourth Day of March, 2015

Michelle K. Lee
*Director of the United States Patent and Trademark Office*